Patented Oct. 1, 1940

2,216,617

UNITED STATES PATENT OFFICE

2,216,617

SURFACE ACTIVE ANIONIC COMPOUNDS OF AMINO ALCOHOLS

Jacob Katz, Providence, R. I.

No Drawing. Application August 31, 1938,
Serial No. 227,665

11 Claims. (Cl. 260—401)

My present invention relates to new products obtainable by the reaction of carboxylic acids containing at least eight carbon atoms with amino secondary alcohols to form amides of secondary alcohols. These substances are compounds with characteristic "mousy" odor, and are insoluble in water and petroleum ether, but are soluble in alcohol, ethyl ether, orthodichloro benzene, and other organic solvents. They may be made water soluble by treatment with an esterifying agent such as sulphuric acid, chlorsulfonic acid, and various inorganic and organic reagents which are capable of reacting with the secondary hydroxyl group of the alkylol amide to form water soluble amide derivatives. The resulting compounds may be neutralized with either organic or inorganic basic substances as commonly employed for such purposes.

These water soluble amides of secondary alcohols have excellent wetting, detergent, and softening properties and may be used in various processing steps in the textile and allied industries. They have exceptional stability in highly acid solutions as well as strongly basic solutions, and may be used in acid dyeing, basic dyeing, mercerising, finishing, etc.

I prepare these new derivatives by heating the carboxylic acid with an amino secondary alcohol and treating the resulting alkylol amide with an esterifying agent wherein the corresponding "ate or onate" compound is formed, an example of a typical compound being lauryl iso-propanol amide sulphate.

The fatty acids may be capric, lauric, undecylenic, myristic, palmitic, oleic, ricinoleic, stearic, dihydroxy stearic, erucic, stearylgluconic acid, sebacic, and various derivatives of these compounds. Other mono basic and dibasic acids can also be used, including those of the aromatic, hydroaromatic, cyclic and heterocyclic compounds, examples of which are benzoic acid, abietic acid, naphthenic acid, and quinaldine carboxylic acid.

The primary amino secondary alcohols belong to that class of chemical compounds which are known as the primary mono amine derivatives of secondary alcohols. The amino secondary alcohol may also contain various substituted groupings such as, alkyl, aryl, aralkyl, etc.

The following are examples of such compounds: monoisopropanol amine, 1-amino-2 hydroxy butane, 1-amino-3-methyl-2 butanol, 8-amino-2-hydroxy octanol, glucoseamine, glycerol amine, and their derivatives.

The reaction between the carboxylic acid and the amino secondary alcohols may be written as follows:

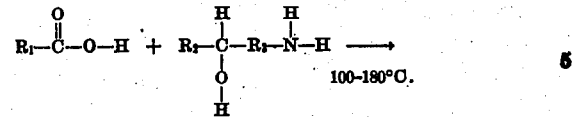

Carboxylic acid    Amino secondary alcohol

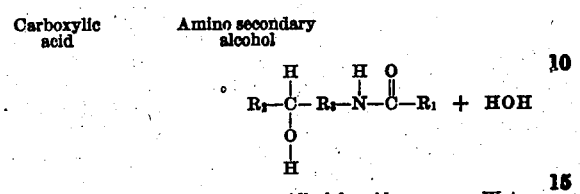

Alkylol amide    Water and the reaction between the alkylol amide and the polybasic inorganic acid as follows:

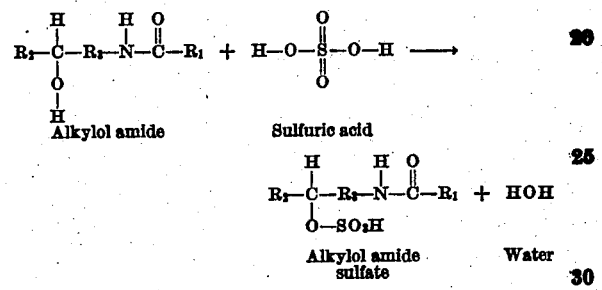

Alkylol amide    Sulfuric acid

Alkylol amide sulfate    Water

In the above reaction $R_1$ is a fatty grouping containing from 8 to 22 carbon atoms; $R_2$ is an alkyl, aryl, alkyl-aryl grouping which may contain OH, S, O, and various other groups in the radical. $R_3$ is an organic group which may be the same as $R_2$, wherein other hydroxy groups may be connected with the carbon atoms or the carbon atoms may be broken by the S, P, O, and other inorganic elements or groups of elements. In accordance with my invention, the esterifying agent reacts with a secondary alcohol as illustrated in the above example and the resulting ester is then neutralized.

The amides of the amino secondary alcohols have much lower melting points than the corresponding normal alkylol amides, and their water soluble derivatives have different chemical and physical properties.

These amides of the secondary alcohols as well as the normal alkylol amides, have the property of reacting with boric acid to form boric acid esters. The reaction is between the hydroxy group of the secondary alcohol and the boric acid.

The reaction of the hydroxy amide and the boric acid may be three (3) mols of hydroxy amide per mol of boric acid or one mol of boric acid per mol of amide. In this way the ortho and meta boric acid derivative may be obtained as well as the intermediate products between them which apparently consists of mixtures of the compounds named.

The reaction is carried out by slowly heating the mixture of the hydroxy amide and boric acid until the temperature reaches above 100° C. when the water of reaction distills over. As soon as all the boric acid has gone into solution the reaction is completed in vacuo at a final temperature of about 180° C.

These boric acid derivatives react quantitatively with the common sulfonating agents to produce water soluble products, which when properly neutralized, have excellent wetting, emulsifying, foaming and detergent properties. These boric acid derivatives are specifically covered in the continuation-in-part, Serial No. 289,433, filed August 10, 1939.

The following examples will serve to illustrate my invention, the parts being by weight. The proportions used in the examples are one mol amino secondary alcohol amine per carboxylic acid grouping.

*Example 1.*—210 parts of coconut oil fatty acids are melted and 75 parts of mono iso propanol amine are added thereto. A light yellow jell is formed, which upon further heating turns to a clear yellow liquid. Heat is gently applied until the temperature gradually rises to 200° C. As the product fumes copiously while being heated, the reaction should be conducted under a well-ventilated hood. Acid values should be taken of the mixture at various intervals of the experiment; when the acid value is zero the experiment is complete. Heating is now stopped and the isoalkylol amide is allowed to cool to a hard wax M. pt. 46–48° C. The product is then sulphonated with equal weights of monohydrate. The resultant mixture when properly neutralized is a white paste with excellent detergent and wetting properties.

*Example 2.*—284 parts of stearic acid are placed in a liter distilling flask and 75 parts of mono iso propanol amine added. The apparatus is then arranged as for vacuum distillation and heat gently applied to remove the fumes. The water of reaction and a small amount of amine distill over, and the drip is analyzed for water and amine content. When the calculated amount of water is collected in the drip, the acid value of the mixture in the flask is taken; it should be zero and final temperature should be around 225° C. The reaction product is then cooled and treated in a manner similar to Example 1.

*Example 3.*—282 parts oleic acid and 75 parts of mono iso propanol amine are reacted as above. The resultant product is a red viscous oil with a typical odor. Treatment with 66° Bé. sulfuric acid results in a water soluble product which has excellent wetting properties.

*Example 4.*—298 parts of ricinoleic acid and 90 parts of 1 amino-2 hydroxy butane are placed in an apparatus similar to Example 2 and the temperature gradually raised to 150° C. The mixture is kept at this temperature for three hours and the temperature finally increased until the calculated amount of water has distilled over and the acid value of the resultant product is zero. The iso butanol amide is a red brown liquid having a characteristic amino odor. The iso butanol amide is then treated with an esterifying agent and neutralized. A good washing compound results.

*Example 5.*—1 mol of myristic acid and one mol of 8-amino-2 octanol $$CH_3CHOHCH_2(CH_2)_4CH_2NH_2$$

are placed in an apparatus similar to that described in Example 2, and the reaction conducted in the same manner. The product when sulphonated and neutralized yields a compound of good wetting and detergent properties.

*Example 6.*—1 mol of dihydroxy stearic acid and 1 mol (103 parts) of 1-amino-3 methyl-2 butanol $CH_2NH_2CHOHCH(CH_3)_2$ are reacted as in Example 2, the resultant product being solubilized by treatment with an esterifying agent and neutralized to form an exceptional emulsifying agent. The product when used in small quantities in a finishing bath imparts a soft, full hand to the cloth.

*Example 7.*—1 mol of stearic acid is reacted with 1 mol of glycerol amine for a period of six (6) hours at approximately 180–200° C. The reaction is carried out as in Example 2 and the resultant compound is sulphonated with monohydrate and neutralized to produce a compound of excellent emulsifying properties. When applied to textile fabrics, an exceptional soft full hand results.

*Example 8.*—1 mol of abietic acid is reacted with 1 mol of mono isopropanol amine as in Example 2 to form a red brown resin which upon treatment with an esterifying substance results in a water soluble wetting compound.

*Example 9.*—The reaction of 1 mol of ricinoleic acid with 1 mol of glucosamine as in Example 2 and treating the resulting compound with 2 mols of sulphuric acid of 66° Bé. to form a water soluble derivative. The product may be neutralized with either caustic soda or triethanol amine.

*Example 10.*—The reaction of 1 mol of sebacic acid with 2 mols of mono isopropanol amine as in Example 2 and the resulting diamide is treated with concentrated sulphuric acid and neutralized to form a water soluble substance.

*Example 11.*—1 mol of alkylated benzoic acid is condensed with 1 mol of 1-amino-2-hydroxybutane to form an amide which upon treatment with $H_2SO_4$ yields a water soluble substance of excellent wetting properties.

*Example 12.*—One mol of coconut oil fatty acid is reacted with one mol of iso propanol amine as outlined in Example 2. The ortho boric acid ester is then formed as described in the body of the specification, and sulphonated at 35° C. with one mol of sulphuric acid. The sulphonate is then neutralized with caustic soda solution and finished to form a white paste containing 50% water. The product has exceptional detergent properties and is three to four times as efficient as soap.

*Example 13.*—210 lbs. of coconut oil fatty acid are reacted with 75 lbs. of mono ethanol amine to form the fatty ethanol amide. The fatty ethanol amide is then mixed with 62 lbs. of boric acid and the mixture is slowly heated until the water distills over, whereupon the temperature is gradually raised to 200° C. under a vacuum of 5 cm. The product is then cooled and treated with sulphuric acid to form the water soluble sulphonate. The neutralized product is an excellent scouring agent for textiles.

Note that in the case of unsaturated fatty acids, their derivatives, etc., that the action of the esterifying agent may be both at the double bond of the fatty acid molecule and the hydroxy groups of the alkylol amide. It should be noted in particular that the action of the esterifying agent may be with various groupings contained in the molecule besides the hydroxy group or groups of the iso alkylol amine. It is understood that these groupings are of such structure that they are capable of reacting with the esterifying agent.

These water soluble alkylol amides may be used in place of soap, sulphonated oils, sulphonated alcohols, etc. in any industry where these substances are now employed regardless of the purposes for which they are used.

I claim:

1. As a surface active anionic compound of an amido propanol, a sodium salt of a sulphated iso propanol amide of a relatively high molecular weight fatty acid having at least eight carbon atoms, said compound being useful as an assistant in textile, leather, and allied industries.

2. As a surface active anionic compound of an amido propanol, a sodium salt of the sulphated iso propanol amide and of coconut fatty acids having at least eight carbon atoms, said compound being useful as an assistant in textile, leather, and allied industries.

3. As a surface active anionic compound, a compound having the formula:

$$R_1C:O-NH-R_2-CHOX-R_3$$

where $R_1$ contains at least eight carbon atoms, where $R_2$ is a low molecular weight aliphatic group and $R_3$ is hydrocarbon group and $X$ is an esterifying group of a polybasic inorganic acid.

4. A process of making surface active anionic compounds of amino alcohols which comprises condensing together an iso propanol amine and a relatively high molecular weight fatty acid having at least eight carbon atoms to form an iso propanol amide and then esterifying the secondary alcohol group of the amide with sulphuric acid whereby there is obtained a material useful as an assistant in the textile, leather and allied industries.

5. A surface active anionic compound of an amino alcohol containing only a secondary alcohol group or groups, comprising a soluble salt of an alkylol amide of a relatively high molecular weight carboxylic acid, said alkylol amide having at least one secondary alcohol group esterified by a polybasic inorganic acid and having at least eight carbon atoms, said compound being useful as an assistant in the textile, leather and allied industries.

6. A process of making surface active anionic compounds of amino alcohols which comprises condensing together an amino alkylol containing only a secondary alcohol group or groups and a relatively high molecular weight carboxylic acid having at least eight carbon atoms to form an alkylol amide, and then esterifying at least one secondary alcohol group of the amide with a polybasic inorganic acid, whereby a material useful as an assistant in the textile, leather and allied industries results.

7. A process of making surface active anionic compounds of amino alcohols which comprises condensing together an amino secondary alcohol having only a secondary alcohol group or groups and a relatively high molecular weight carboxylic acid having at least eight carbon atoms to form an alkylol amide, esterifying at least one secondary alcohol group of the amide with a polybasic inorganic acid, and then neutralizing with an alkali to form a water soluble salt, whereby there is obtained a material useful as an assistant in the textile, leather and allied industries.

8. In the manufacture of surface active anionic compounds of amino secondary alcohols having only a secondary alcohol group or groups, the step of esterifying at least one secondary alcohol group of an alkylol amide having at least eight carbon atoms, with a polybasic inorganic acid.

9. In the manufacture of surface active anionic compounds of amino secondary alcohols having only a secondary alcohol group or groups, the steps of esterifying at least one secondary alcohol group of an alkylol amide having at least eight carbon atoms, with a polybasic inorganic acid and neutralizing the resulting product.

10. In the manufacture of surface active anionic compounds of amino secondary alcohols having only a secondary alcohol group or groups, the steps of esterifying at least one secondary alcohol group of an alkylol amide having at least eight carbon atoms, with a polybasic inorganic acid and neutralizing the resulting product with an inorganic base.

11. In the manufacture of surface active anionic compounds of amino secondary alcohols having only a secondary alcohol group or groups, the steps of esterifying at least one secondary alcohol group of an alkylol amide having at least eight carbon atoms, with a polybasic inorganic acid and neutralizing the resulting product with an organic base.

JACOB KATZ.